Feb. 12, 1952   R. KREIMENDAHL   2,585,557
FASTENING MEANS FOR STRUCTURAL SANDWICHES
Filed April 19, 1946
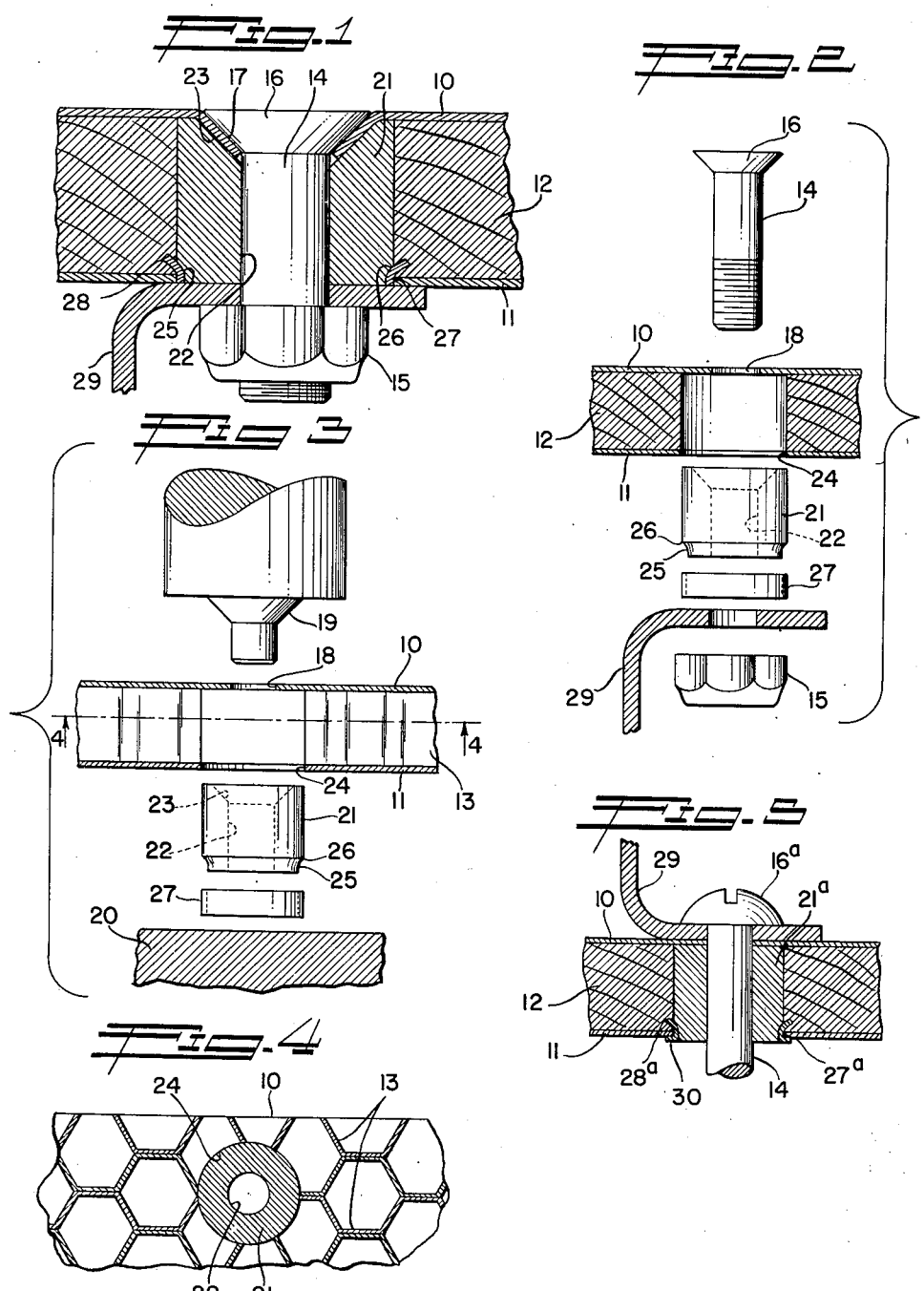
INVENTOR.
RODNEY KREIMENDAHL
BY
George A. Sullivan
Agent Patented Feb. 12, 1952

2,585,557

UNITED STATES PATENT OFFICE 2,585,557

FASTENING MEANS FOR STRUCTURAL SANDWICHES

Rodney Kreimendahl, Burbank, Calif., assignor to Lockheed Aircraft Corporation, Burbank, Calif.

Application April 19, 1946, Serial No. 663,345

2 Claims. (Cl. 189—34)

This invention relates to fastening means for transferring stresses and strains into the stressed skins of so-called structural sandwiches wherein high strength skins are bonded to a low strength and low density core.

Examples of such aircraft structural sandwiches, which may be either flat sheets or curved to conform to a desired configuration, include a plywood faces on a balsa wood core, as used in the British Mosquito bomber; steel, aluminum or magnesium faces on either balsa, foamed or cellular resin, and fiber glass honeycomb cores, and woven fiber glass on a fiber glass honeycomb core. These examples have in common, high strength stressed skins stabilized against buckling by a low density core; and fastening such sandwiches to other structure, or vice versa, presents difficulties in transferring the load to the high strength skins without crushing or distorting the stabilizing core. The foregoing examples of structural sandwich combinations can all be molded to the desired final configuration while curing, cementing or gluing the skins to the core, so that such structural sandwiches or laminates are not limited to flat sheets usable as flooring, bulkheads, and the like. Such sandwiches or laminations offer promising fields of application in aircraft structures which require the best possible combination of strength and lightness, but the application thereof has heretofore presented difficulties in the joining of sections and the attachment of bulkheads, structural members and fittings, since the load transfer should desirably be direct to the stressed skin, to the exclusion of the core material.

It is accordingly, an object of this invention to provide means for attachment to such sandwiches or laminations wherein the attaching members, such as bolts and rivets, transfer their loads directly to the stressed skins without a tendency to load or crush the weak core material. To this end I provide an insert which is placed in abutting relationship to the inner face of one skin and clamped thereto upon tightening the bolt or driving the rivet, and the other end of which is lockingly engaged to the other skin of the sandwich as by expanding a collar inside the surface of the latter skin.

It is also an object of this invention to provide such an insert for the purpose described which can be either preassembled in desired locations in the sandwich or can be assembled and clinched therein at the time the fastening is applied thereto.

Other objects and features of the invention will be readily understood from the following detailed description of a typical preferred form of the invention wherein reference will be made to the accompanying drawings in which:

Figure 1 is a fragmentary enlarged section through a portion of a sandwich in which an insert embodying the features of this invention is shown in connection with a bolt attached to a structural member.

Figure 2 is an exploded view corresponding to Figure 1 on a smaller scale, showing the various parts prior to assembly.

Figure 3 is an exploded view illustrating the pre-assembly of the insert in connection with a dimpling tool, the sandwich shown having a honeycomb core.

Figure 4 is a section on the line 4—4 of Figure 3 with the insert in position therein.

Figure 5 illustrates a modified form of expansible collar embodying a washer-like flange.

As shown in the drawings:

The details of the sandwich per se form no part of my invention and may comprise plywood, metal or glass cloth skins bonded to solid, foamed, cellular or honeycomb cores of balsa wood, resins or glass fiber impregnated with suitable resins. In Figures 1, 2 and 5, I have chosen to show metal skins 10 and 11 with balsa wood cores 12, while in Figures 3 and 4 I show metal skins and fiber glass honeycomb cores 13. In either case the skins 11 carry all or a major part of the load while the cores stabilize the thin high-strength skins so that they will develop a substantial portion of their ultimate compressive strength without buckling. The shear rigidity of the core must therefore be enough to hold the entire sandwich combination stable until the skins develop their full strength; but in practice the core is unable to sustain concentrated local compressive stresses due to fastenings such as a bolt 14 and its nut 15, shown for illustrative purposes. If a bolt with a countersunk head 16 is used the head thereof may be used to produce its own dimple 17 in the adjacent skin 10, at the same time as the bolt locks the insert of this invention in place in the sandwich; or the hole 18 for the bolt may be pre-dimpled with conventional dimpling tools as indicated in Figure 3 wherein a dimpling die 19 and anvil 20 are shown and used to both dimple and lock the insert in place.

The insert of this invention comprises a bushing 21 centrally apertured at 22 for a desired fastening device such as the bolt 14, and provided with a countersunk area 23 at its bolt head end in the event a countersunk head bolt is used.

This bushing 21 is inserted in a corresponding opening 24 drilled through the lower skin 11 and core 12 or 13, in alignment with the bolt hole 18 in the upper skin 10. The length of the bushing is such that when seated against the inner side of the upper skin 10, the lower face of the bushing is substantially flush with the outer surface of the lower skin 11. The lower end of the bushing is cut down at 25 and provides a rounded shoulder 26 on the bushing, the radius of the fillet of the shoulder being desirably started from a point in alignment with the inner side of the lower skin 11 so that the straight length of the reduced diameter 25 approximates the thickness of the lower skin. A sleeve 27 of the same external diameter as the major diameter of the bushing 21, and having a bore corresponding to the diameter 25 of the bushing, is somewhat longer than the distance to the shoulder 26 so that when the sleeve is forced up on the fillet of the shoulder its inner end will be flared or spread by the fillet as indicated at 28 in Figures 1 and 5. This spreading action causes the flared portion 28 to engage the inner edge of the opening 24 in the lower skin 11. Accordingly, when the sandwich is bolted to a structural member or bracket 29, as shown in Figure 1, the lower skin 11 is clamped between the sleeve flare 28 and the member 29, while the upper skin 10 is clamped between the top of the bushing 21 and the bolt head 16. Thus loads on the bolt or fastening 14 are transferred directly into the skins 10 and 11; and the bushing 21 also prevents any local crushing or distortion of the core material 12 or 13. The bushing 21 and its collar 27 may be assembled in the sandwich at any time, and when once the collar is expanded it becomes a permanent part of the sandwich so that the fastening member can be removed and replaced as often as desired.

Figure 5 illustrates two independent modifications, one wherein the collar 27a is provided with a shoulder or flange 30 which gives the effect of a washer and also restrains the lower skin from bulging when the fastener is not in place. In this modification, the bushing 21a will be made slightly longer, to be flush with the outer face of the flange 30 when the latter is in contact with the skin 11. The bolt 14 is also shown with a round head 16a, and the bushing 21a is therefore not dimpled, this variation being used when fastening objects to the surface 10.

Having described only a typical form of the invention I do not wish to be limited to the specific details herein set forth, but wish to reserve to myself any variations or modifications that may appear to those skilled in the art or fall within the scope of the following claims.

I claim as my invention:

1. In combination with a preformed structural sandwich having high-strength outer laminations and a low density core, one of said laminations and said core being formed with aligned openings, a tubular bushing accommodated in said aligned openings and having an inner end abutting the inner face of the other of said laminations, said other lamination having an aperture in alignment with the bore of said bushing, the outer end of said tubular bushing having a neck of reduced diameter which occupies the opening in said first mentioned lamination and which is flared to provide a shoulder, and a collar fitting over said neck and deformed by engagement with said shoulder, the inner end of the collar being expanded outwardly and engaging behind the marginal portion of the opening-defining edge of said first mentioned lamination.

2. In combination with a preformed structural sandwich having high-strength outer laminations and a low density core and a fastener connecting said sandwich to a structural element having an aperture therein, one of the laminations of said sandwich and said core being formed with aligned openings, a tubular bushing accommodated in said aligned openings and having an inner end abutting the inner face of the other lamination of said sandwich, said other lamination having an aperture in alignment with the bore of said bushing and the aperture in said structural element also being in alignment with the bore through said bushing, said fastener extending through the bore of said bushing and the aligned apertures in said element and said other lamination, the outer end of said tubular bushing having a neck of reduced diameter which occupies the opening in said first mentioned lamination and which is flared to provide a shoulder, and a collar fitting over said neck and deformed by engagement with said shoulder, the inner end of said collar being expanded outwardly and engaging behind the marginal portion of the opening-defining edge of said first mentioned lamination, said fastener transferring any load to which it is subjected directly to said high-strength outer laminations without crushing said core.

RODNEY KREIMENDAHL.

REFERENCES CITED

The following references are of record in the file of this patent:

UNITED STATES PATENTS

| Number | Name | Date |
|---|---|---|
| 2,086,503 | King | July 6, 1937 |
| 2,358,783 | Best | Sept. 26, 1944 |
| 2,403,330 | Benton | July 2, 1946 |